United States Patent [19]

Kubo et al.

[11] Patent Number: 5,316,840
[45] Date of Patent: May 31, 1994

[54] WALLPAPER

[75] Inventors: Kouji Kubo; Shigeichi Kobayashi, both of Chiba, Japan

[73] Assignee: Sumitomo Chemical Company, Limited, Osaka, Japan

[21] Appl. No.: 907,621

[22] Filed: Jul. 2, 1992

[30] Foreign Application Priority Data

Jul. 9, 1991 [JP] Japan .................. 3-167911

[51] Int. Cl.$^5$ .................................. B32B 9/00
[52] U.S. Cl. .................. 428/318.4; 428/513; 428/537.5
[58] Field of Search ............ 428/211, 314, 326, 318.4, 428/513, 537.5

[56] References Cited

U.S. PATENT DOCUMENTS

| | | | |
|---|---|---|---|
| 3,839,238 | 10/1974 | Ealding | 521/79 |
| 4,039,709 | 8/1977 | Newman | 428/159 |
| 4,259,386 | 3/1981 | Wagstaffe | 428/159 |
| 4,361,668 | 11/1982 | Lawson | 524/398 |

FOREIGN PATENT DOCUMENTS

| | | |
|---|---|---|
| 0098608 | 1/1984 | European Pat. Off. . |
| 58-4879 | 1/1983 | Japan . |
| 60-92342 | 5/1985 | Japan . |
| 61-254647 | 11/1986 | Japan . |
| 62-4733 | 1/1987 | Japan . |
| 2187434 | 7/1990 | Japan . |
| 1566273 | 4/1980 | United Kingdom . |

*Primary Examiner*—George F. Lesmes
*Assistant Examiner*—Chris Raimund
*Attorney, Agent, or Firm*—Sughrue, Mion, Zinn, Macpeak & Seas

[57] ABSTRACT

Wallpaper comprising flame retardant paper having laminated thereon an expanded sheet is disclosed, in which the expanded sheet is obtained by expanding at an expansion ratio of 1.5 or more a resin composition containing (A) 100 parts by weight of an ethylene-α-olefin copolymer having a melt flow rate of from 0.2 to 50 g/10 min, a density of not more than 0.91 g/cm$^3$, and a maximum melting peak temperature of 100° C. or higher and a heat of fusion at 100° C. or higher of 10 J/g or more as measured with a differential scanning calorimeter and (B) 60 parts by weight or more of magnesium hydroxide or a mixture of magnesium hydroxide and aluminum hydroxide at a weight ratio of from 100/0 to 20/80. The wallpaper has high safety, is free from bleeding of a plasticizer, gives off no offensive odor, and satisfies the requirements of 2nd class (semi-noncombustible) of fireproof wall coverings.

2 Claims, No Drawings

WALLPAPER

FIELD OF THE INVENTION

This invention relates to wallpaper and, more particularly, to wallpaper having a polyolefin resin surface layer which passes as semi-noncombustible (2nd class) in the flame retardant rating test for fireproof wall coverings.

BACKGROUND OF THE INVENTION

Plastic wallpaper mainly has a surface layer of soft polyvinyl chloride (PVC). However, PVC evolves hydrogen chloride gas on combustion and suffers from surface stains due to bleeding of a plasticizer.

In order to overcome these disadvantages, substitution of soft PVC by an ethylene-vinyl acetate copolymer (EVA) has been proposed as disclosed in JP-A-58-4879 (the term "JP-A" as used herein means an "unexamined published Japanese patent application"). While the wallpaper having an EVA surface layer improves the problems of safety and surface stains due to plasticizer bleeding as compared with the wallpaper having a PVC surface layer, it involves different disadvantages, such as poor strength and odor due to a residual vinyl acetate monomer, and is still unsatisfactory as a wall covering.

SUMMARY OF THE INVENTION

An object of the present invention is to provide novel wallpaper having a polyolefin resin surface layer which is free from the problems of safety, bleeding of a plasticizer, and odor as encountered in the case of using a PVC or EVA surface layer.

The inventors have conducted extensive investigations to provide wallpaper having a novel polyolefin resin surface layer in place of PVC or EVA. As a result, it has now been found that plastic wallpaper having excellent physical properties and higher safety than PVC wallpaper can be obtained by laminating flame retardant paper on an expanded sheet of a resin composition comprising a specific ethylene-α-olefin copolymer resin and magnesium hydroxide alone or a mixture of magnesium hydroxide and aluminum hydroxide. The present invention has been completed based on this finding and further studies.

The present invention relates to wallpaper comprising flame retardant paper having laminated thereon an expanded sheet obtained by expanding at an expansion ratio of 1.5 or more a resin composition containing (A) 100 parts by weight of an ethylene-α-olefin copolymer having a melt flow rate (MFR) of from 0.2 to 50 g/10 min, a density of not more than 0.91 g/cm$^3$, and a maximum melting peak temperature of 100° C. or higher and a heat of fusion at 100° C. or higher of 10 J/g or more as measured with a differential scanning calorimeter (DSC) and (B) 60 parts by weight or more of magnesium hydroxide or a mixture of magnesium hydroxide and aluminum hydroxide at a weight ratio of from 100/0 to 20/80.

DETAILED DESCRIPTION OF THE INVENTION

The ethylene-α-olefin copolymer as component (A) is obtained by polymerization of ethylene and an α-olefin having from 3 to 18 carbon atoms in the presence of a Ziegler catalyst.

The polymerization reaction is usually carried out in a gas-solid, liquid-solid, or homogenous liquid phase in the presence or absence of a solvent at a temperature of from 30° to 300° C. under a pressure of from atmospheric pressure to 3,000 kg/cm$^2$. It is preferable to conduct the polymerization by high-pressure bulk polymerization at a temperature of from 130° to 300° C. under a pressure of from 300 to 3,000 kg/cm$^2$.

Examples of suitable α-olefins include those having from 3 to 10 carbon atoms, such as propylene, butene-1, 4-methylpentene-1, hexene-1, octene-1, and decene-1. These α-olefins may be used either individually or in combinations of two or more thereof.

The Ziegler catalyst which can be used in the polymerization preferably includes those composed of a compound of the group IVb and/or Vb transition metal element and a compound of the group IIb and/or IIIa metal element. Examples of the transition metal compound include halides, alkoxides, etc. of titanium, zirconium, hafnium, or vanadium. Composite compounds composed of such a transition metal compound and a halide of the group IIa and/or IIIa typical metal element, such as magnesium chloride or aluminum chloride, are also suitable. Examples of the compound of the group IIb and/or IIIa metal element are zinc and/or aluminum hydride and/or organometallic compounds. Specific examples of these Ziegler catalysts are described in JP-A-49-97088, JP-A-49-97089, JP-A-50-50487, JP-A-52-103485, JP-A-54-26889, JP-A-54-146285, JP-A-56-99209, JP-A-57-131208, JP-A-57-145106, JP-A-58-27706, JP-A-58-65708, and JP-A-59-133210.

The ethylene-α-olefin copolymer to be used as component (A) in the present invention has an MFR of from 0.2 to 50 g/10 min, preferably from 0.3 to 30 g/10 min, and more preferably from 0.5 to 20 g/10 min; and a density of not more than 0.91 g/cm$^3$, preferably from 0.86 to 0.91 g/cm$^3$, and more preferably from 0.87 to 0.90 g/cm$^3$. If the MFR is less than 0.2 g/10 min, the resin composition has poor processability. If it exceeds 50 g/10 min, the resulting resin sheet has poor strength. If the density exceeds 0.91 g/cm$^3$, the sheet has reduced softness.

The ethylene-α-olefin copolymer has a maximum melting peak temperature of 100° C. or higher and a heat of fusion at 100° C. or higher of 10 J/g or more as measured with a DSC. If the DSC maximum melting peak temperature is less than 100° C., or if the DSC heat of fusion at 100° C. or higher is less than 10 J/g, the composition has poor heat resistance.

It is preferable that magnesium hydroxide and aluminum hydroxide to be used as component (B) are previously surface treated with a surface treating agent, such as higher fatty acids, higher alcohols, paraffins, and silane coupling agents, for the purpose of improving dispersibility in and compatibility with component (A).

Component (B) is magnesium hydroxide alone or a mixture of magnesium hydroxide and aluminum hydroxide at a magnesium hydroxide to aluminum hydroxide weight ratio of from 100/0 to 20/80. Component (B) is used in an amount of at least 60 parts by weight, and preferably at least 100 parts by weight, per 100 parts by weight of component (A), the ethylene-α-olefin copolymer.

If the amount of component (B) is less than 60 parts by weight, the composition has insufficient flame retardance. In using a mixture of magnesium hydroxide and aluminum hydroxide as component (B), if the proportion of magnesium hydroxide in the mixture is less than 20% by weight, the composition gives an expanded sheet with a rough surface, i.e., poor surface smoothness. Further, the amount of aluminum hydroxide is preferably not more than 100 parts by weight per 100 parts by weight of component (A), the ethylene-α-olefin copolymer.

The wallpaper according to the present invention is prepared as follows.

Components (A) and (B) are mixed at a prescribed ratio by a general mixing operation, such as mixing in a Banbury mixer or extrusion pelletizing, to obtain a resin compound. If desired, the resin compound may further contain additives, such as neutralizing agents, dispersants, antioxidants, weather improving agents, antistatic agents, and pigments, as far as the effects of the present invention are not impaired.

The resulting resin compound is then expanded at an expansion ratio of 1.5 or more to obtain an expanded sheet. If the expansion ratio is less than 1.5, the expanded sheet has insufficient flame retardance, and the resulting wallpaper fails to pass as 2nd class of fireproof wall coverings.

Expansion of the resin compound into a sheet can be effected by general expansion molding processes, for example, a process comprising compounding a chemical blowing agent, such as azodicarbonamide (ADCA) and p,p'-oxybisbenzenesulfonyl hydrazide (OBSH), into the above-prepared resin compound and molding the expanding composition into a sheet by extrusion, calendering, hot press molding, etc., followed by expansion under heat, and a process in which molding and expansion are conducted simultaneously by extrusion molding or hot press molding using a chemical blowing agent and/or a physical blowing agent.

Flame retardant paper which can be used in the present invention includes, for example, paper impregnated with a guanidine compound, etc. disclosed in JP-B-51-17606 (the term "JP-B" as used herein means an "examined published Japanese patent application"), JP-A-50-33696, JP-A-50-7397, and JP-B-51-6763.

Laminating of the expanded sheet and flame retardant paper may be carried out by, for example, fusion bonding of flame retardant paper at the time of forming an expanded sheet, bonding with an adhesive, or bonding with fusible polyethylene, etc.

The present invention is now illustrated in greater detail by way of Examples, but it should be understood that the present invention is not construed as being limited thereto. All the parts are by weight unless otherwise indicated.

The physical properties of the ethylene-α-olefin copolymer used and the performance properties of the laminated sheets obtained were measured and evaluated according to the following test methods.

(1) MFR (g/10 min):
Measured according to JIS K7210 at a temperature of 190° C. under a load of 2.16 kg.

(2) Density (g/cm$^3$):
Measured according to JIS K6760.

(3) DSC Maximum Meltino Peak Temperature (°C.):
Measured according to JIS K7121. A differential scanning calorimeter "Perkin-Elmer Model 7" was used.

(4) DSC Heat of Fusion at 100° C. or Hiqher (J/g):
Measured according to JIS K7122. The same DSC as used in (3) above was used. The conditioning of the specimen was conducted according to JIS K7122, Item 3-(2).

(5) Surface Test:
Measurements were made according to JIS A1321-1975 along Notification No. 1372 of the Ministry of Construction (Matters including specifying semi-noncombustible materials and flame-retardant materials). Standards of semi-noncombustible materials are as follows.

(i) Time-temperature area (°C.·min) above the standard temperature curve $\leq 100$ (ii) Emitting smoke factor per unit area (CA) $\leq 60$ (6) Stickiness:
Visually judged and rated as "good" or "bad".

(7) Appearance of Expanded Sheet:
Visually judged and rated as "good" or "bad".

EXAMPLE 1

A hundred parts of an ethylene-butene-1 copolymer ("EXCELLEN VL100", a product of Sumitomo Chemical Co., Ltd., prepared by high-pressure bulk polymerization at 200° C. and 1,000 kg/cm$^2$; MFR: 0.8 g/10 min; density: 0.900 g/cm$^3$; DSC maximum melting peak temperature: 114° C.; DSC heat of fusion at 100° C. or higher: 15 J/g) as component (A) and 150 parts of magnesium hydroxide ("KISUMA 5B" produced by Kyowa Chemical Industry Co., Ltd.) as component (B) were kneaded in a Banbury mixer at 150° C. for 10 minutes and pelletized by means of an extruder having a screw diameter of 65 mm at 180° C.

To the resulting resin compound was added 2 parts of a chemical blowing agent master batch ("CELLMIC MB 2043" produced by Sankyo Kasei K.K.; main component: OBSH), and the compound was molded and expanded by means of an inflation molding machine having a screw diameter of 55 mm at a cylinder temperature of 160° C. and at an extrusion rate of 20 kg/hr to obtain a 0.2 mm thick expanded sheet. The expansion ratio of the expanded sheet was 2.0.

Subsequently, the expanded sheet and flame-retardant paper having a basis weight of 80 g/m$^2$ were laminated via an adhesive layer of molten low-density polyethylene extruded from a T-die at 310° C. by means of a sandwich extrusion laminator to obtain a laminated sheet. The resulting laminated sheet was evaluated according to the above-described test methods. The results obtained are shown in Table 1 below.

EXAMPLE 2

A resin compound was prepared in the same manner as in Example 1, except for using 100 parts of the same component (A) as used in Example 1 and 80 parts of the same component (B) as used in Example 1.

To the resin compound was added 2.5 parts of a chemical blowing agent master batch "CELLMIC MB 2043", and the resulting compound was molded and expanded in an inflation molding machine having a screw diameter of 55 mm at a cylinder temperature of 160° C. and at an extrusion rate of 20 kg/hr while introducing carbon dioxide into the molding machine (pressure: 40 kg/cm$^2$; flow rate: 80 l/min) to obtain a 0.25 mm thick expanded sheet. The expanded sheet had an expansion ratio of 3.0.

Flame-retardant paper (basis weight: 80 g/m$^2$) was then laminated thereon in the same manner as in Example 1 to obtain a laminated sheet. The resulting laminated sheet was evaluated. The results obtained are shown in Table 1.

EXAMPLE 3

A hundred parts of the same component (A) as used in Example 1, 100 parts of magnesium hydroxide "KISUMA 5B", and 50 parts of aluminum hydroxide ("CL-303" produced by Sumitomo Chemical Co., Ltd.) were kneaded and pelletized in the same manner as in Example 1.

Two parts of the same chemical blowing agent master batch as used in Example 1 was added to the resulting resin compound, and the resin compound was molded and expanded in the same manner as in Example 1 to obtain a 0.2 mm thick expanded sheet. The expansion ratio of the expanded sheet was 1.9.

Flame-retardant paper (basis weight: 80 g/m$^2$) was laminated thereon in the same manner as in Example 1 to obtain a laminated sheet. The resulting laminated sheet was evaluated. The results obtained are shown in Table 1.

EXAMPLE 4

A hundred parts of the same component (A) as used in Example 1, 75 parts of magnesium hydroxide "KISUMA 5B", and 75 parts of aluminum hydroxide "CL-303" were kneaded and pelletized in the same manner as in Example 1.

Two parts of the same chemical blowing agent master batch as used in Example 1 was added to the resin compound, and the resin compound was molded and expanded in the same manner as in Example 1 to obtain a 0.2 mm thick expanded sheet. The expansion ratio of the expanded sheet was 2.1.

Flame-retardant paper (basis weight: 80 g/m$^2$) was laminated thereon in the same manner as in Example 1 to obtain a laminated sheet. The resulting laminated sheet was evaluated. The results obtained are shown in Table 1.

EXAMPLE 5

A hundred parts of the same component (A) as used in Example 1, 30 parts of magnesium hydroxide "KISUMA 5B", and 70 parts of aluminum hydroxide "CL-303" were kneaded and pelletized in the same manner as in Example 1.

Three parts of the same chemical blowing agent master batch as used in Example 1 was added to the resin compound, and the resin compound was molded in the same manner as in Example 1 to obtain a 0.23 mm thick expanded sheet. The expansion ratio of the expanded sheet was 2.6.

Flame-retardant paper (basis weight: 80 g/m$^2$) was laminated thereon in the same manner as in Example 1 to obtain a laminated sheet. The resulting laminated sheet was evaluated. The results obtained are shown in Table 1.

COMPARATIVE EXAMPLE 1

A resin compound containing no chemical blowing agent master bath was prepared in the same manner as in Example 1. The resin compound was molded by means of the same inflation molding machine as used in Example 1 at a cylinder temperature of 160° C. and at a rate of extrusion of 20 kg/hr to obtain a 0.2 mm thick non-expanded sheet.

Flame-retardant paper (basis weight: 80 g/m$^2$) was laminated thereon in the same manner as in Example 1 to obtain a laminated sheet. The resulting laminated sheet was evaluated. The results obtained are shown in Table 1.

COMPARATIVE EXAMPLE 2

A hundred parts of the same component (A) as used in Example 1 and 150 parts of the same component (B) as used in Example 1 were kneaded and pelletized in the same manner as in Example 1.

To the resin compound was added 0.5 part of the same chemical blowing agent master batch as used in Example 1, and the resin compound was molded and expanded in the same manner as in Example 1 to obtain a 0.2 mm thick expanded sheet. The expansion ratio of the expanded sheet was 1.2.

Flame-retardant paper (basis weight: 80 g/m$^2$) was laminated thereon in the same manner as in Example 1 to obtain a laminated sheet. The resulting laminated sheet was evaluated. The results obtained are shown in Table 1.

COMPARATIVE EXAMPLE 3

A hundred parts of the same component (A) as used in Example 1 and 150 parts of aluminum hydroxide "CL-303" as component (B) were kneaded and pelletized in the same manner as in Example 1.

To the resin compound was added 2 part of the same chemical blowing agent master batch as used in Example 1, and the resin compound was molded and expanded in the same manner as in Example 1 to obtain a 0.2 mm thick expanded sheet. The expansion ratio of the expanded sheet was 1.8.

Flame-retardant paper (basis weight: 80 g/m$^2$) was laminated thereon in the same manner as in Example 1 to obtain a laminated sheet. The resulting laminated sheet was evaluated. The results obtained are shown in Table 1.

COMPARATIVE EXAMPLE 4

A hundred parts of the same component (A) as used in Example 1, 10 parts of magnesium hydroxide "KISUMA 5B", and 90 parts of aluminum hydroxide "CL-303" were kneaded and pelletized in the same manner as in Example 1.

Three parts of the same chemical blowing agent master batch as used in Example 1 was added to the resin compound, and the compound was molded in the same manner as in Example 1 to obtain a 0.22 mm thick expanded sheet. The expansion ratio of the expanded sheet was 2.5.

Flame-retardant paper (basis weight: 80 g/m$^2$) was laminated thereon in the same manner as in Example 1 to obtain a laminated sheet. The resulting laminated sheet was evaluated. The results obtained are shown in Table 1.

COMPARATIVE EXAMPLE 5

Wallpaper having a flame-retardant PVC surface layer (expansion ratio: 3.0) was evaluated in the same manner as in the foregoing examples. The results obtained are shown in Table 1.

TABLE 1

|  | Example No. | | | | | Comparative Example No. | | | | |
| --- | --- | --- | --- | --- | --- | --- | --- | --- | --- | --- |
|  | 1 | 2 | 3 | 4 | 5 | 1 | 2 | 3 | 4 | 5 |
| Component (B) (part): | | | | | | | | | | |
| Magnesium hydroxide | 150 | 80 | 100 | 75 | 30 | 150 | 150 | 0 | 10 | — |
| Aluminum hydroxide | 0 | 0 | 50 | 75 | 70 | 0 | 0 | 150 | 90 | — |
| Expansion Ratio of Expanded Sheet | 2.0 | 3.0 | 1.9 | 2.1 | 2.6 | 1.0 | 1.2 | 1.8 | 2.5 | 3.0 |
| Surface Test: | | | | | | | | | | |
| Time-Temperature Area (°C · min) | 80 | 90 | 82 | 85 | 83 | 180 | 150 | 95 | 84 | 60 |
| Emitting Smoke Factor (CA) | 10 | 8 | 11 | 8 | 9 | 15 | 12 | 11 | 9 | 25 |
| Stickiness | good | good | good | good | good | good | good | good | good | bad |
| Appearance of Expanded Sheet | good | good | good | good | good | — | good | bad | bad | good |

As described above, the present invention provides wallpaper having a polyolefin resin surface layer which is excellent in safety and free from bleeding of a plasticizer. From the results of the surface test, the wallpaper according to the present invention proved to satisfy the requirements of 2nd class (semi-noncombustible) of fireproof wall coverings.

While the invention has been described in detail and with reference to specific examples thereof, it will be apparent to one skilled in the art that various changes and modifications can be made therein without departing from the spirit and scope thereof.

What is claimed is:

1. Wallpaper comprising flame retardant paper having laminated thereon an expanded sheet obtained by expanding at an expansion ratio of 1.5 or more a resin composition containing (A) 100 parts by weight of an ethylene-α-olefin copolymer having a melt flow rate of from 0.2 to 50 g/10 min, a density of not more than 0.91 g/cm$^3$, and a maximum melting peak temperature of 100° C. or higher and a heat of fusion at 100° C. or higher of 10 J/g or more as measured with a differential scanning calorimeter and (B) 60 parts by weight or more of magnesium hydroxide or a mixture of magnesium hydroxide and aluminum hydroxide at a weight ratio of from 100/0 to 20/80, wherein said ethylene-α-olefin copolymer is a copolymer obtained by copolymerizing ethylene and an α-olefin having from 3 to 18 carbon atoms in the presence of a Ziegler catalyst at a temperature of from 130° to 300° C. and at a pressure of from 300 to 3,000 kg/cm$^2$.

2. Wallpaper as claimed in claim 1, wherein said expanded sheet is a surface layer.

* * * * *